United States Patent
Gurney et al.

(10) Patent No.: US 10,064,204 B2
(45) Date of Patent: Aug. 28, 2018

(54) METHOD, DEVICE, AND SYSTEM FOR SETTING AN OPERATING PARAMETER OF A RADIO RECEIVER BASED ON A PREDICTED RADIO SIGNAL ENVIRONMENT

(71) Applicant: MOTOROLA SOLUTIONS, INC., Schaumburg, IL (US)

(72) Inventors: David P. Gurney, Carpentersville, IL (US); Joseph P. Heck, Fort Lauderdale, FL (US); Bradley M. Hiben, Glen Ellyn, IL (US); Stephen L. Kuffner, Algonquin, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 155 days.

(21) Appl. No.: 15/092,535

(22) Filed: Apr. 6, 2016

(65) Prior Publication Data
US 2017/0295582 A1 Oct. 12, 2017

(51) Int. Cl.
*H04W 72/08* (2009.01)
*H04W 4/02* (2018.01)

(52) U.S. Cl.
CPC ......... *H04W 72/085* (2013.01); *H04W 4/025* (2013.01); *H04W 72/082* (2013.01)

(58) Field of Classification Search
CPC combination set(s) only.
See application file for complete search history.

(56) References Cited

U.S. PATENT DOCUMENTS

| | | | |
|---|---|---|---|
| 6,954,446 B2 | 10/2005 | Kuffner | |
| 8,060,104 B2 | 11/2011 | Chaudhri et al. | |
| 8,660,498 B2 | 2/2014 | Gurney et al. | |
| 9,042,850 B2 | 5/2015 | Chia et al. | |
| 2010/0069070 A1* | 3/2010 | Shi | H04W 36/32 455/436 |
| 2010/0265913 A1* | 10/2010 | Gorokhov | H04W 36/0055 370/331 |
| 2011/0287778 A1* | 11/2011 | Levin | G01S 5/0252 455/456.1 |
| 2015/0373644 A1* | 12/2015 | Sathy | H04W 52/0222 370/311 |

OTHER PUBLICATIONS

TV Fool, internet website, 2016, 2 pages, www.tvfool.com.

\* cited by examiner

*Primary Examiner* — Yee Lam
(74) *Attorney, Agent, or Firm* — Michael Best & Friedrich LLP

(57) ABSTRACT

Method, device, and system for setting an operating parameter of a radio receiver included in a radio based on a predicted radio signal environment. One method includes determining an operating location of the radio. The method also includes determining a transmission characteristic of at least one base station. The method further includes predicting, with an electronic processor, the radio signal environment of the radio receiver based on the transmission characteristic of the at least one base station and the operating location of the radio. The method also includes setting the operating parameter of the radio receiver based on the radio signal environment.

18 Claims, 6 Drawing Sheets

METHOD, DEVICE, AND SYSTEM FOR SETTING AN OPERATING PARAMETER OF A RADIO RECEIVER BASED ON A PREDICTED RADIO SIGNAL ENVIRONMENT

BACKGROUND OF THE INVENTION

A radio receiver may experience interference from other transmitting devices, such as base stations, radio transmitters, and the like. As radio-based services expand and as the number of subscribers of radio-based services increases, the interference experienced by a radio receiver may increase. Also, when a radio receiver is mobile, it may be difficult to identify potential interference sources for the radio receiver as interference sources may change as the radio receiver changes location. Furthermore, even when an interference source for a radio receiver is identified, it may be costly to address the interference. For example, permanently changing or re-assigning a communication channel or frequency of a radio-based service to avoid interference may be expensive and a lengthy process. Similarly, incorporating functionality into a radio receiver to address harsh interference may increase the radio receiver's power consumption without providing a benefit in many cases. For example, in some situations, a radio receiver may not experience harsh interference and, hence, may waste battery life and processing resources addressing interference that is not present.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
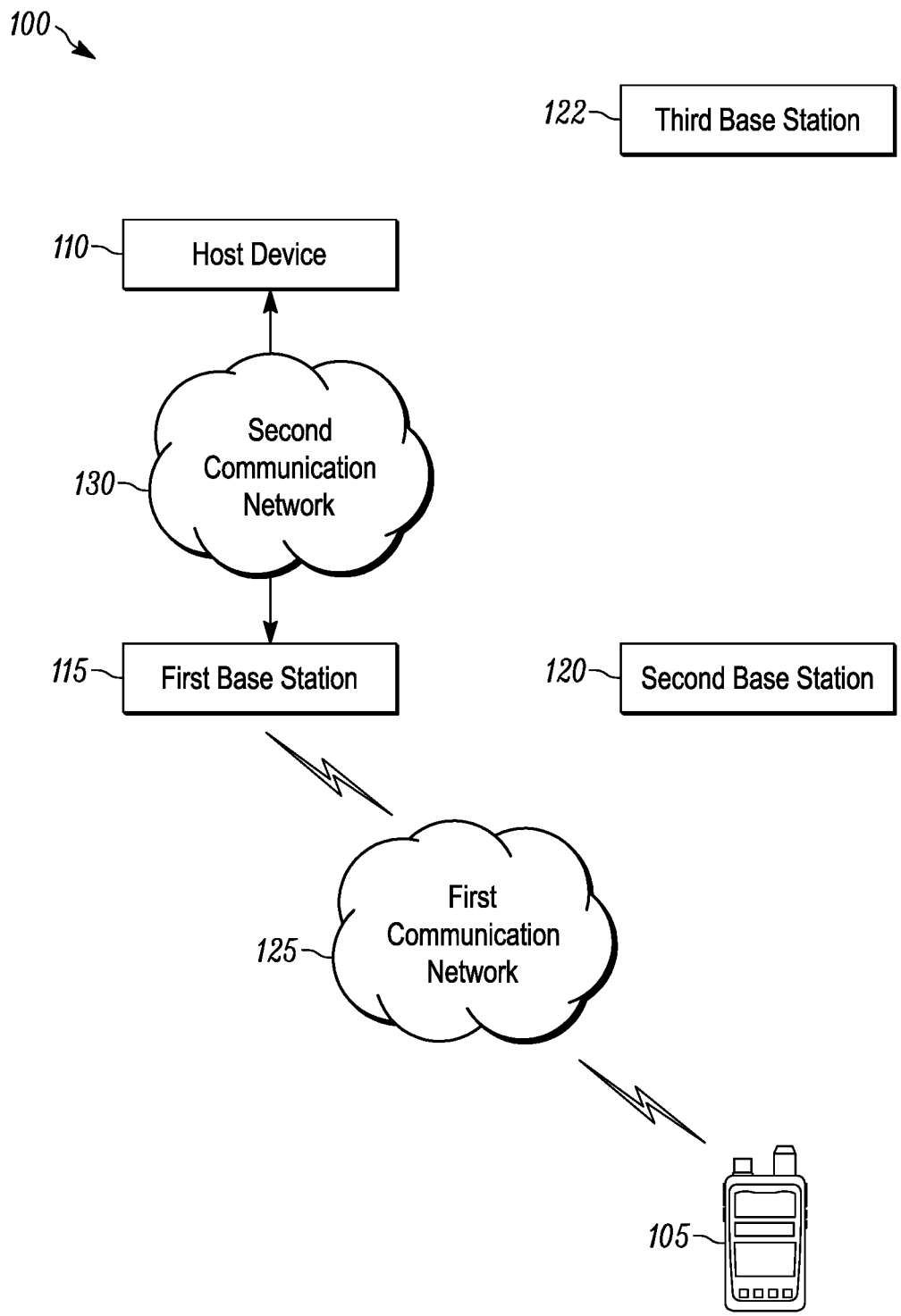
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of setting an operating parameter of a radio receiver included in a radio. The method includes determining an operating location of the radio. The method also includes determining a transmission characteristic of at least one base station. The method further includes predicting, with an electronic processor, a radio signal environment of the radio receiver based on the transmission characteristic of the at least one base station and the operating location of the radio. The method also includes setting the operating parameter of the radio receiver based on the radio signal environment.

Another embodiment provides a communication system including a radio and a host device. The radio includes a radio receiver. The host device includes an electronic processor. The electronic processor is configured to determine an operating location of the radio. The electronic processor is also configured to determine a transmission characteristic of at least one base station. The electronic processor is further configured to predict a radio signal environment of the radio receiver based on the transmission characteristic of the at least one base station and the operating location of the radio. The electronic processor is also configured to set an operating parameter of the radio receiver based on the radio signal environment.

Another embodiment provides a radio including a radio receiver and an electronic processor. The electronic processor is configured to determine an operating location of the radio. The electronic processor is also configured to determine a transmission characteristic of at least one base station. The electronic processor is further configured to predict a radio signal environment of the radio receiver based on the transmission characteristic of the at least one base station and the operating location of the radio. The electronic processor is also configured to set an operating parameter of the radio receiver based on the radio signal environment.

FIG. 1 is a block diagram of a communication system 100 according to one embodiment. The communication system 100 includes a radio 105, a host device 110, a first base station 115, a second base station 120, and a third base station 122. It should be understood that the communication system 100 illustrated in FIG. 1 is provided as one example of such a system and that the methods described herein may be used with communication systems with fewer, additional, or different components in different configurations than the communication system 100 illustrated in FIG. 1. For example, in some embodiments, the communication system 100 includes fewer or additional base stations and may include fewer or additional radios.

Also, as described below, the host device 110 may perform one or more database functions that include a radio signal environment prediction function (hereinafter referred to as the "prediction function") and a receiver adaptation or setting function (hereinafter referred to as the "setting function"). As one example, the methods described herein are described in terms of the host device 110 performing these database functions. However, it should be understood that the database functions may be performed, in whole or in part, by another device or a combination of devices (for example, the radio 105, the first base station 115, and the like).

The radio 105 and the first base station 115 communicate over a first communication network 125. In some embodiments, the first communication network 125 operates according to the Project 25 (P25) specification. In alternate embodiments, the first communication network 125 operates using any other communication protocol including, but not limited to, Terrestrial Trunked Radio (TETRA), Digital Mobile Radio (DMR), and Public Safety Long Term Evolution (LTE). In addition, the radio 105 may be capable of operating in multiple modes (for example, Project 25 and Long Term Evolution simultaneously). In some embodiments, base stations may be part of a vehicular mounted platform. In general, base stations may be fixed, nomadic or mobile, or an access point or client radio.

As illustrated in FIG. 1, the radio 105 may be a handheld device, such as a mobile telephone, a mobile radio, a smart watch or other smart wearable, or another portable device configured to communicate over the first communication network 125. For example, in some embodiments, the radio 105 may be a handheld cellular telephone carried by public safety personnel, such as a police officer. Alternatively, radio 105 may be a vehicular mounted mobile radio. Accordingly, it should be understood that the radio 105 may be any type of radio capable of communicating over the first communication network 125.

The host device 110 may be a server that is accessible either directly or indirectly by the radio 105 and, as noted above, performs one or more database functions. For example, the database functions may reside in a server connected to the Internet or in another dedicated private server (for example, as part of a public safety system). In alternative embodiments, the host device 110 may be at least partially implemented in a radio, such as a mobile telephone, a mobile radio, and the like. The host device 110 and the first base station 115 may communicate over a second communication network 130. The second communication network 130 may be a wired or a wireless communication network, such as a cellular network, the Internet, a land mobile radio (LMR) network (for example Project 25, Terrestrial Trunked Radio, and Digital Mobile Radio), a Bluetooth™ network, a WiFi network, a wireless accessory Personal Area Networks (PAN), a Machine-to-machine (M2M) autonomous network, a public switched telephone network, a future developed network, or any combination or derivative thereof. It should be understood that in some embodiments, the first communication network 125 and the second communication network 130 are the same network or operate using the same communication protocol.

In the embodiment illustrated in FIG. 1, the radio 105 communicates with the host device 110 via the first base station 115. In alternate embodiments, the radio 105 communicates directly with the host device 110. For example, in one embodiment, the radio 105 communicates with the host device 110 via a network according to the Project 25 specification. In an alternate embodiment, the radio 105 communicates with the host device 110 using short-range radio signals, such as Bluetooth™ or WiFi signals.

The first base station 115, the second base station 120, and the third base station 122 each include a wireless receiver and a wireless transmitter and each serve as a central device (for example, a hub) that facilitates communication between multiple radios (and other communication devices) in a communication network. For example, the first base station 115 serves as a hub for the first communication network 125.

In the example illustrated in FIG. 1, the radio 105 communicates with the first base station 115 over the first communication network 125 but may or may not communicate with the second base station 120 or the third base station 122. For example, the second base station 120 may serve as a hub for a communication network that is different than the first communication network 125. However, as described in more detail below, signals transmitted by the second base station 120, the third base station 122, or both may interfere with signals received by the radio 105 over the first communication network 125. As an example, the first communication network 125 of the first base station 115 may be a Band-14 Public Safety Long Term Evolution network and the communication network of the second base station 120 (and the third base station 122) may be a Band-13 Commercial Long Term Evolution network. The radio 105 may communicate with both of these networks; however, signals of the Band-13 Commercial Long Term Evolution network may interfere with ability of the radio 105 to receive signals of the Band-14 Public Safety Long Term Evolution network. A similar interference situation may occur within single frequency networks.

Although FIG. 1 only illustrates the second base station 120 and the third base station 122 as potential sources of interference for the radio 105, in some embodiments, there may be additional potential sources of interference for the radio 105. For example, additional base stations, other radios, or other local sources of interference may generate local radio signals that interfere with desired signals received by the radio 105.

Figure 2:
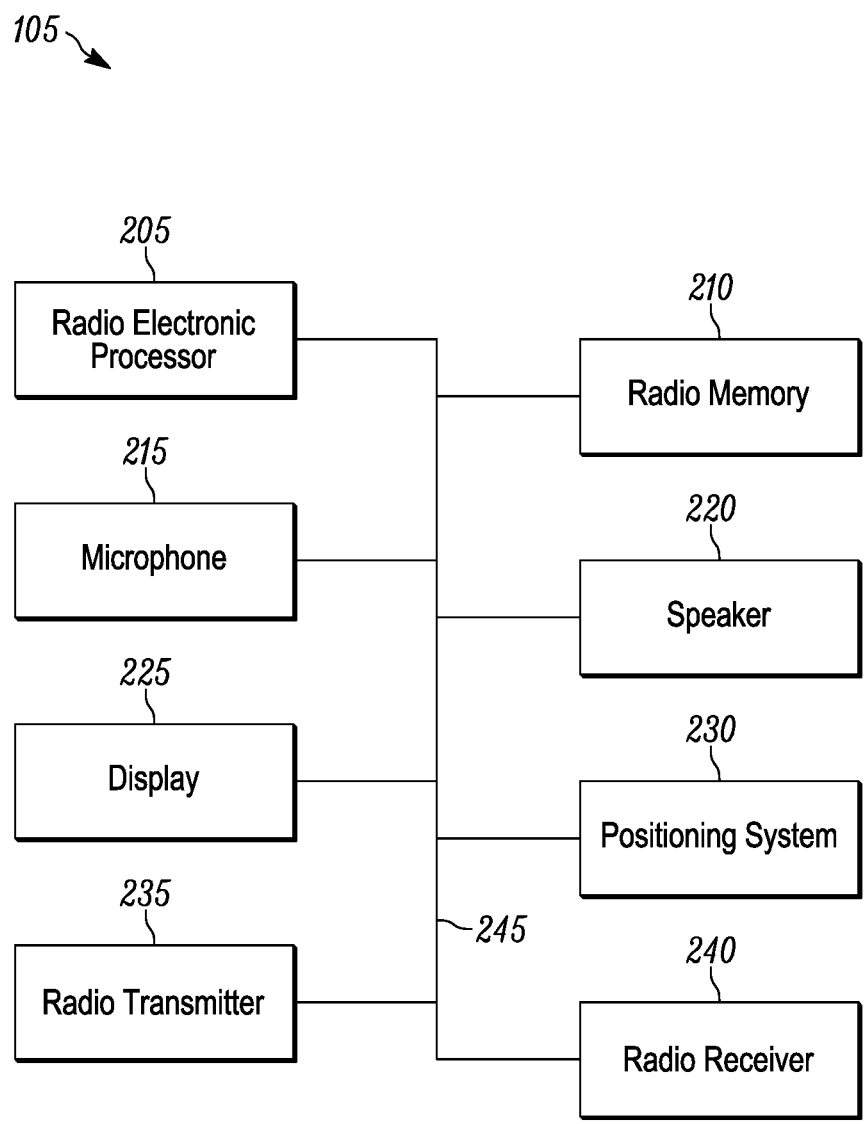
FIG. 2 is a block diagram of a radio included in the communication system of FIG. 1 in accordance with some embodiments.

FIG. 2 is a block diagram of the radio 105 according to one embodiment. As illustrated in FIG. 2, the radio 105 may include a radio electronic processor 205, a radio memory 210, a microphone 215, a speaker 220, a display 225, a positioning system 230, a radio transmitter 235, and a radio receiver 240. The radio electronic processor 205, the radio memory 210, the microphone 215, the speaker 220, the display 225, the positioning system 230, the radio transmitter 235, and the radio receiver 240 communicate through one or more communication lines 245. It should be understood that, in other embodiments, the radio 105 may include fewer or additional components in configurations different from that illustrated in FIG. 2.

The radio memory 210 (for example, read-only memory (ROM), random-access memory (RAM), flash memory, or combinations thereof) stores instructions and data. The radio electronic processor 205 retrieves instructions from the radio memory 210 and executes the instructions to perform a set of functions including, for example, at least some of the methods described herein.

The microphone 215 detects acoustic signals and outputs audio signals to the radio electronic processor 205. The speaker 220 receives audio signals from the radio electronic processor 205 and outputs acoustic signals. The display 225 provides a visual output (for example, graphical indicators, lights, colors, text, images, combinations of the foregoing, and the like) regarding a status of the radio 105. The display 225 includes a suitable display mechanism for displaying the visual output (for example, a light-emitting diode (LED) screen, a liquid crystal display (LCD) screen, or an organic light-emitting diode (OLED) screen).

The positioning system 230 may receive radio-frequency signals from orbiting satellites using one or more antennas and receivers (not shown). The positioning system 230, such as an electronic processor included in the positioning system 230, determines geo-spatial positioning (for example, latitude, longitude, altitude, speed, and the like) for the radio 105 based on the received radio-frequency signals. The positioning system 230 communicates this positioning information to the radio electronic processor 205. In some embodiments, the positioning system 230 may include a Global Positioning System (GPS). As described in more detail below, as an alternative or in addition to determining geo-spatial positioning for the radio 105, the positioning system 230 or another component included in the radio 105 or external to the radio 105 may use other ways of determining the operating location of the radio 105 such as time difference of arrival (TDOA), network-assisted, or inertial mechanisms.

The radio transmitter 235 transmits signals to the first communication network 125, and the radio receiver 240 receives signals from the first communication network 125. Signals may include, for example, audio data, location data, and data packets. In some embodiments, the radio transmitter 235 and the radio receiver 240 are contained within a single radio transceiver. In other embodiments, the radio 105 may not include the radio transmitter 235 (for example, in a receive-only system, such as a weather radio or satellite receiver). In some embodiments, the radio 105 may perform the database functions described herein.

Figure 3:
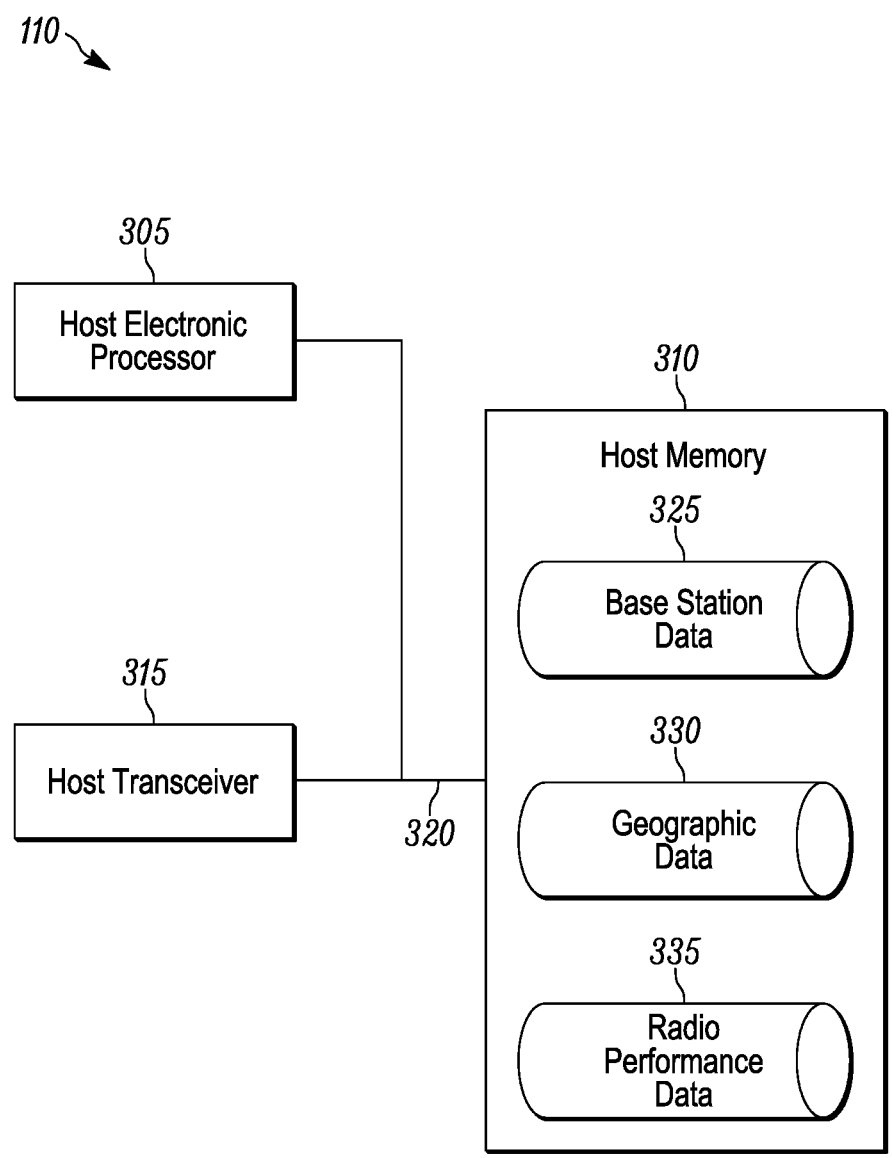
FIG. 3 is a block diagram of a host device included in the communication system of FIG. 1 in accordance with some embodiments.

FIG. 3 is a block diagram of the host device 110 according to one embodiment. As illustrated in FIG. 3, the host device 110 may include a host electronic processor 305, a host memory 310, and a host transceiver 315. The host electronic processor 305, the host memory 310, and the host transceiver 315 communicate through one or more communication lines 320. It should be understood that, in other embodiments, the host device 110 may include fewer or additional components in configurations different from that illustrated in FIG. 3. Also, in some embodiments, the host transceiver 315 may be a separate device from the host device 110 (separate from the host electronic processor 305 and host memory 310). Similarly, in some embodiments, the host electronic processor 305 may be included in a separate device from the host memory 310, the host transceiver 315, or both. The host memory 310 may also reside in multiple locations, devices, or processors. For example, it may reside in a server and be accessible on the internet or a private network. In general, the location of the host electronic processor 305, the host memory 310, and the host transceiver 315 is arbitrary, and those skilled in the art will recognize that these components may be implemented in a wide variety of locations and on a wide variety of platforms or devices without any loss of generality.

The host memory 310 (for example, read-only memory (ROM), random-access memory (RAM), flash memory, or combinations thereof) stores instructions and data. The host electronic processor 305 retrieves instructions from the host memory 310 and executes the instructions to perform a set of functions including the methods described herein. The host transceiver 315 transmits signals to and receives signals from the radio 105, such as through the second communication network 130 and the first base station 115, or directly. Signals may include, for example, audio data, location data, and data packets.

The host memory 310 may store instructions executable by the host electronic processor 305 for implementing the one or more database functions referenced above and described in more detail below. In the embodiment illustrated in FIG. 3, the host memory 310 also stores base station data 325, geographic data 330, and radio performance data 335. As described in more detail below, the host device 110 (for example, the host electronic processor 305) uses the data stored in host memory 310 to predict a radio signal environment of the radio receiver 240. It should be understood that, in some embodiments, the host memory 310 includes additional data than the data illustrated in FIG. 3. Furthermore, in some embodiments, the base station data 325, the geographic data 330, the radio performance data 335, or combinations or portions thereof may be stored in separate memories included in the host device 110 or in one or more memories external to the host device 110. Accordingly, in some embodiments, the host device 110 accesses the base station data 325, the geographic data 330, the radio performance data 335, or combinations or portions thereof from an external device (for example, over a wired or wireless connection). For example, in some embodiments, a portion of the radio performance data 335 may be stored in the radio memory 210. In some embodiments, other data (for example, the base station data 325 and the geographic data 330) may also be stored in the radio memory 210.

The base station data 325 includes a transmission characteristic for each of a plurality of base stations (including the first base station 115, the second base station 120, and the third base station 122). The transmission characteristic for a base station includes one or more transmission parameters related to that base station. The transmission parameters for a base station may include one or more of a location of the base station, a transmitter frequency of the base station, a transmitter output power level (for example, an effective isotropic radiated power (EIRP) or transmitter power output (TPO) level) of the base station, an antenna height of an antenna of the base station, an antenna polarization of the antenna of the base station, and an antenna pattern of the antenna of the base station. The antenna pattern may include directional gain information of the antenna for azimuth patterns, elevation patterns, or both. Additional transmission parameters for a base station may include a transmitter system loading level (for example, how many or which communications resources are currently being used in a communications system), a transmission timing reference (for example, a transmission duty cycle or time division duplex reference timing), or a transmitter out-of-band emissions (OOBE) level (for example, into adjacent or alternate channels). An example of communications resources currently being used in a communications system may include a list of sub-carriers that are active in an orthogonal frequency division multiple access (OFDMA) system, and, optionally, the transmission power level of each active sub-carrier versus time.

In some embodiments, the host device 110 obtains the base station data 325 or a portion thereof from the first base station 115, the second base station 120, the third base station 122, or a combination thereof. Alternatively, or in addition, the base station transmission parameters may be gathered in other ways (for example, via site surveys, regulatory filings, or through querying regulatory databases). For example, in some embodiments, the host device 110 may query a base station or a regulatory database (upon configuration of the host device 110 or periodically) for one or more transmission parameters. Private databases of base station data (or transmission parameters) may be also be maintained. Alternatively or in addition, a base station may be configured to automatically transmit one or more transmission parameters to the host device 110 (upon configuration of the base station or periodically). As noted above, the host device 110 may use the base station data 325 to identify potential interference sources for the radio 105 that may be used to predict a radio signal environment of the radio receiver 240 as described below.

The geographic data 330 includes information (for example, digital models and three dimensional (3D) representations) about the terrain (for example, hills, valleys, etc.) and structures (for example, buildings and houses) within an area of the Earth's surface. The geographic data 330 may include digital elevation models, digital terrain models, and digital surface models. In some embodiments, the geographic data 330 may include information about different types of foliage or other types of obstructions that are present. Similar to the base station data 325, the host device 110 may use the geographic data 330 to identify potential path loss sources for the radio receiver 240, such as tall buildings or mountain ranges, which may be used to predict a radio signal environment of the radio receiver 240. In this manner, shadowed signal paths may be identified, and the overall radio signal environment may be further predicted (for example, as high interference environments or multipath environments, as described below). In general, any one of a variety of signal propagation models may be employed (for example, Longley-Rice or Hata) to predict desired and non-desired (interfering) signal strengths. Also, in some embodiments, the radio signal environment may be precomputed and stored for a plurality of potential receiver operating locations. This information may be compressed and stored in the radio 105 or on a server accessible via a wired or wireless connection (for example, the host device 110).

The radio performance data 335 may include a performance specification for each of a plurality of radio receivers, including the radio receiver 240. A performance specification may specify, for a particular radio receiver, an operating frequency range, a frequency stability, an analog sensitivity level, a digital sensitivity level, a frequency selectivity (for example, receiver adjacent channel rejection (ACR) and alternate channel rejection levels, or a complete receiver frequency response), an inter-modulation specification (for example, an inter-modulation rejection (IMR) level), a spurious response rejection (SRR) level, a tolerable blocker level (which may be dependent on blocker frequency and blocker signal type), available signal filtering, delay spread tolerance, or a combination thereof. The above quantities may vary (and be stored) for different operating modes of the radio receiver 240 (for example, inter-modulation rejection (IMR) performance may be improved in a high linearity operating mode, multipath or delay spread tolerance may be improved in extended equalization or diversity modes). The above quantities may also vary depending on absolute signal levels (for example, of desired signal strength). In some embodiments, a radio performance specification is associated with one or more specific model numbers of the radio receiver 240. As described in more detail below, the host device 110 may use the radio performance data 335 to identify types of signals or signal environments that may cause interference for the radio receiver 240 given the performance specification of the radio receiver 240. Alternatively or in addition, the host device 110 may use the radio performance data 335 to identify how to set one or more operating parameters of the radio receiver 240 given the predicted radio signal environment.

As noted above, the radio receiver 240 may experience interference from other transmitting devices. Measuring interference locally (for example, in the radio 105) may require additional hardware, expend additional processing resources, and may not be accurate in some cases (for example, for out-of-band signals, or in cases of strong signal interference). Further, the radio receiver 240 may experience varying amounts of interference as the radio 105 changes location. Accordingly, as described below, the database functions predict a radio signal environment of the radio receiver 240 and use the prediction to set one or more operating parameters of the radio receiver 240. The radio 105 uses these functions to anticipate the radio signal environment before the radio 105 actually enters it and experiences degraded service (for example, from sub-optimal receiver parameter settings).

As noted above, in some embodiments, the host device 110 performs the database functions including the prediction function and the setting function. For example, in some embodiments, the host device 110, or more particularly, the host electronic processor 305 executing instructions, may perform the method 400 illustrated in FIG. 4 to set one or more operating parameters of the radio receiver 240. However, as noted above, in other embodiments, the method 400 or portions thereof may be performed by other devices, including, for example, the radio 105, the first base station 115, another server, another radio, or a combination thereof. For example, in some embodiments, the radio 105 may both perform the prediction function and the setting function performed as part of the method 400. In other embodiments, the host device 110 may perform the prediction function (for example, in a server remote from the radio 105) and the radio 105 may perform the setting function. The method 400 is also described in terms of the communication system 100 illustrated in FIG. 1 to provide one example. However, it should be understood that the method 400 may be applied to other communication systems and is not limited to the communication system 100 illustrated in FIG. 1.

Figure 4:
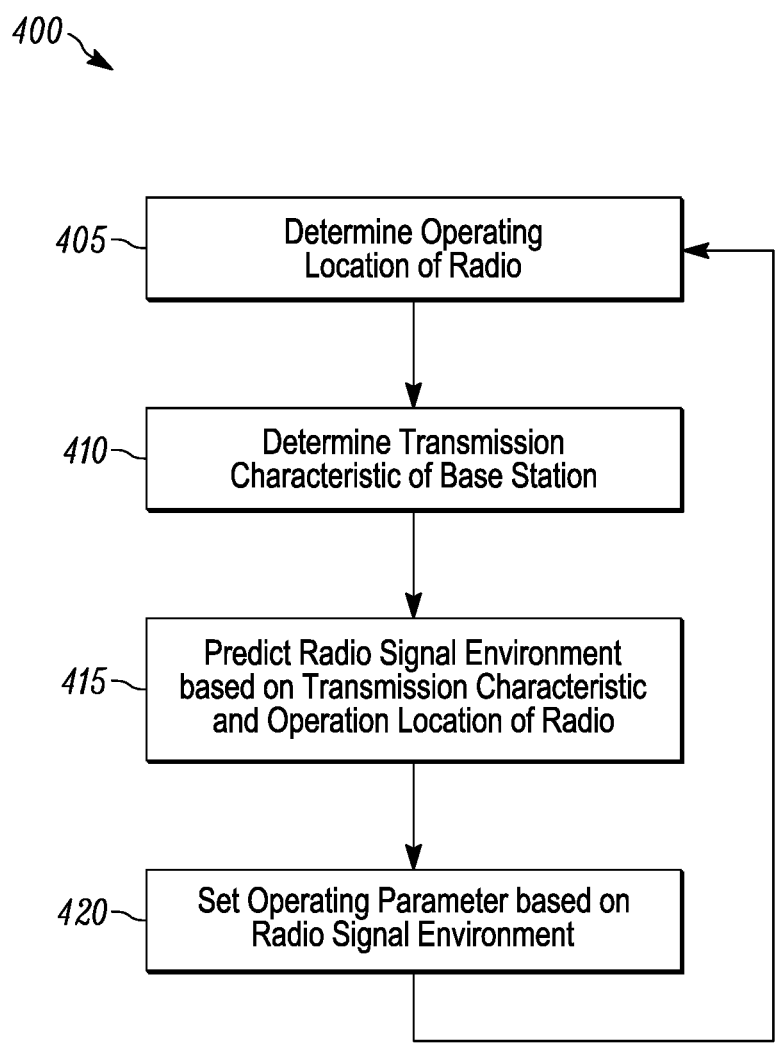
FIG. 4 is a flowchart of a method of setting an operating parameter of a radio receiver performed by the communication system of FIG. 1 in accordance with some embodiments.

As illustrated in FIG. 4, the method 400 includes the host device 110 determining an operating location of the radio 105 (at block 405). In some embodiments, the host device 110 determines the operating location of the radio 105 based on data received from the radio 105. For example, the positioning system 230 of the radio 105 may determine the operating location of the radio 105 (for example, using a Global Positioning System), and the radio transmitter 235 may transmit the operating location to the host device 110, such as via the first base station 115. Alternatively or in addition, the host device 110 may determine the operating location of the radio 105 based on data received from the first base station 115 or another device separate from the radio 105. For example, in some embodiments, the first base station 115 may store data identifying a current operating location of the radio 105 and other radios communicating over the first communication network 125. Therefore, in these embodiments, the host device 110 may transmit an identifier of the radio 105 to the first base station 115 as a request for the operating location of the radio 105. The host device 110 may receive the identifier of the radio 105 from the radio 105 or the identifier may be preprogrammed in the host memory 310.

Alternatively or in addition, the host device 110 may approximate the operating location of the radio 105. For example, the radio 105 may transmit (for example, via the radio transmitter 235 or a separate transmitter) a signal that has a predetermined range, and the host device 110 may receive the signal (for example, via the host transceiver 315 or a separate transceiver). In response to receiving such a signal from the radio 105, the host device 110 may determine that the radio 105 is within a predetermined distance (within the predetermined range associated with the signal), which the host device 110 may use to approximate the operating location of the radio 105. In particular, the host device 110 may approximate the operating location of the radio 105 to be the location of the host device 110, the location of the host device 110 plus the range of the signal or a portion thereof, and the like. The host device 110 may approximate the operating location of the radio 105 in embodiments where the radio 105 and the host device 110 communicate with each other using short range communications (for example, Bluetooth™ or WiFi). As an example, the host device 110 may reside in a vehicle (for example, with global positioning system capability) and the radio 105 may be operating within a building (for example, with no or limited global positioning system coverage). The host device 110 may use alternative ways of determining the operating location of the radio 105 such as time difference of arrival (TDOA), network-assisted, or inertial mechanisms. The positioning or short range communications mechanisms may also be utilized to help determine when the radio 105 may be operated indoors, and at what elevation the radio 105 is being operated. This information may in turn be fed back to the host device 110 to adjust the prediction function.

Returning to FIG. 4, after determining the operating location of the radio 105, the host device 110 determines a transmission characteristic of at least one base station (at block 410). In some embodiments, the host device 110 determines a transmission characteristic for a base station by accessing the base station data 325 stored in the host memory 310. Alternatively or in addition, the host device 110 may determine a transmission characteristic for a base station by communicating with the base station or a separate device. For example, using the example communication system 100 illustrated in FIG. 1, the host device 110 may transmit a request, via the second communication network 130, to the first base station 115 for a transmission characteristic. The first base station 115 transmits the requested transmission characteristic to the host device 110 via the second communication network 130. The first base station 115 may store the transmission characteristic locally, access the transmission characteristic from an external device, calculate the transmission characteristic dynamically, or a combination thereof. As the transmission characteristics of fixed base stations do not change very often, they may be stored in the base station data 325 accessible by the host device 110. Alternatively, the transmission characteristics of a mobile transmitter may change more frequently (such as the transmitter location parameter), requiring more frequent updates of the base station data 325.

After determining the transmission characteristics, the host device 110 performs the prediction function to predict a radio signal environment of the radio receiver 240 based on the determined transmission characteristics and the operating location of the radio 105 (at block 415). The predicted radio signal environment represents an estimate of the desired signal and/or interference that the radio receiver 240 may experience when the radio 105 is positioned at the operating location. The prediction function may apply one or more functions (for example, radio signal propagation models) or look-up tables to predict the radio signal environment of the radio receiver 240. As an example, a look-up table may include a contour map of power levels generated by measurement data fed back by the devices. In some embodiments, the prediction function may determine at least one value that represents the predicted radio signal environment, where a higher value represents greater (or stronger) signal or interference than a lower value or vice versa. The prediction function may determine the at least one value based on one or more base stations identified as potential interference sources, the locations of the base stations, the transmitter output power levels of the base stations, other transmission parameters of the base stations, and the like. Also, in some embodiments, the prediction function may exclude base stations initially identified as potential interference sources when the prediction function identifies that the base station does not cause interference or does not cause interference above a predetermined threshold.

In some embodiments, the determined values representing the predicted radio signal environment may represent the predicted radio signal environment. In other embodiments, the prediction function may compare the determined values to one or more thresholds to classify the predicted radio signal environment into one of a plurality of cases. As described below, the case may specify how or which operating parameter of the radio receiver 240 is set. Additional details and examples of the prediction function are provided below (see FIG. 5).

After performing the prediction function, the host device 110 may perform the setting function that sets an operating parameter of the radio receiver 240 based on the predicted radio signal environment (at block 420). The setting function may set the operating parameter of the radio receiver 240 by transmitting a signal to the radio 105 that includes data on setting the operating parameter. Alternatively or in addition, the setting function may set the operating parameter of the radio receiver 240 by transmitting a signal to the first base station 115, which the first base station 115 may forward to the radio 105 with or without further processing. In other embodiments, the setting function may be performed by the radio receiver 240, and the prediction results may be accessible to the radio 105 through wired or wireless connections.

In some embodiments, the setting function sets an operating parameter of the radio receiver 240 by changing a filtering mode of the radio receiver 240, changing a linearity mode of the radio receiver 240 (for example, low noise amplifier linearity or mixer linearity), changing an attenuation setting of the radio receiver 240 (for example, front-end attenuation), changing a gain setting of the radio receiver 240 (for example, front-end gain, low noise amplifier (LNA) gain, intermediate frequency (IF) gain, and the like), changing a local oscillator of the radio receiver 240 (for example, from a low power, low performance integrated voltage controlled oscillator to a high power, high performance external voltage controlled oscillator, or changing to a different channel frequency), adjusting an offset frequency of the radio receiver 240 (for example, to compensate for a predicted Doppler shift or other frequency offset), changing a diversity reception configuration of the radio receiver 240, changing an equalizer setting of the radio receiver 240, or a combination thereof. Alternatively or in addition, in some embodiments, the setting function sets an operating parameter of the radio receiver 240 by disabling functionality of the radio receiver 240, such as altering or turning on or off signal filtering, signal processing (for example, equalization), or disabling a diversity receiver. For example, radio-frequency or baseband processing parameters within the radio receiver 240, such as an oversampling ratio or edge rate of an N-path radio-frequency filter or the bias current or polynomial order of a baseband filter, or an equalization or filtering parameter may be altered or disabled when the prediction function predicts that the radio signal environment will not include a high amount of interference or multipath distortion. In other embodiments, digital filtering could be modified in the radio receiver 240, including reducing analog/digital converter (ADC) resolution, digital down-converter filtering order, and digital filtering complexity (for example, a number of gates, a number of digital signal processing instructions, digital word size for data and filter coefficients, and the like). A diversity receiver branch, included in some embodiments of the radio receiver 240, may be disabled when the prediction function predicts a benign (for example, strong desired signal) radio signal environment. All of these approaches may result in power savings and longer battery life in portable radio equipment. Additional details and examples regarding the setting function are provided below (see FIG. 6).

Also, in some embodiments, the setting function adjusts the operating parameter of the radio receiver 240 based on the radio performance data 335. For example, the setting function may determine a performance specification associated with the model of the radio receiver 240 included in the radio performance data 335 and use the performance specification to determine which operating parameters may be set for the radio receiver 240 and how the operating parameters may be set. In particular, when the predicted radio signal environment calls for a particular type of signal processing, the setting function may use the performance specification associated with the radio receiver 240 to determine whether the radio receiver 240 (or the radio 105) has the hardware or software needed to perform the signal processing. Similarly, in some embodiments, the setting function may consider a current operating status of the radio 105, such as a battery status of the radio 105 or current processing constraints, when determining which operating parameter of the radio receiver 240 to set or how to set the operating parameter. As an example, certain additional signal processing (for example, additional digital filtering, diversity reception, and the like) may be disabled to improve overall radio battery life when the prediction function predicts certain radio signal environments (especially when the battery level is low). In other cases, additional signal processing may be enabled in harsh radio signal environments.

As illustrated in FIG. 4, the method 400 may repeat to predict an updated radio signal environment of the radio receiver 240 as the radio 105 changes location or as the environment around the radio 105 changes, such as a changing number or location of base stations, other radios, and other local interference sources. For example, in some embodiments, the prediction function may predict an updated radio signal when the operating location of the radio 105 changes by more than a predetermined amount. The predetermined amount may be, for example, approximately 5 (five) to 15 (fifteen) meters. However, it should be understood that other amounts either greater or less than this range may be used. For example, in some embodiments, the predetermined amount may be dynamically determined based on the operating location of the radio 105, the previously predicted radio signal environment, or a combination thereof. In particular, when the radio 105 is located in an area with dense clutter, the predetermined amount may be set to a smaller value as compared to when the radio 105 is located in an area with less clutter (for example, in rural areas).

Also, in some embodiments, the prediction function may predict the radio signal environment of the radio receiver 240 along a route, such as a preplanned route or a regular patrol route for the radio 105. In some embodiments, the prediction function may predict a single radio signal environment for the planned route. Alternatively, the prediction function may predict a radio signal environment for multiple locations along the route. Accordingly, the setting function may set the operating parameter of the radio receiver 240 based on the predicted radio signal environment for the entire route or may set an operating parameter of the radio receiver 240 as the radio 105 travels along the route based on the position of the radio 105 along the route. When the radio 105 deviates from the route by more than a predetermined amount, the prediction function may predict an updated radio signal environment of the radio receiver 240 and continue doing so with the aforementioned update triggers until or unless the radio 105 returns to the original preplanned route.

As noted above, the prediction function may predict the radio signal environment in different ways. For example, in some embodiments, the prediction function predicts the radio signal environment of the radio receiver 240 based at least in part on a frequency of one or more signals at the operating location of the radio 105. In particular, the prediction function may estimate the frequency of at least one undesired signal at the operating location of the radio 105. Undesired signals are signals the radio receiver 240 is not intended to receive, such as signals transmitted by a base station that the radio 105 is not communicating with (for example, the second base station 120). In contrast, a desired signal is a signal the radio receiver 240 is intended to receive, such as a signal transmitted by a base station that the radio 105 is communicating with (for example, the first base station 115). The prediction function may estimate the frequency (or frequencies) of desired or undesired signals based on the transmission characteristic of at least one base station. The prediction function may then compare the determined frequency and predicted signal levels or strengths to one or more thresholds to determine a value or classification for the predicted radio signal environment. Alternatively or in addition, the prediction function may determine the value or classification for the predicted radio signal environment based on the ratio of desired to undesired signals.

Signals transmitted by base stations located close to the radio 105 may cause greater interference than signals transmitted by base stations located further away from the radio 105. The transmitted signals that may cause interference may either be on-channel or off-channel (for example, due to on-channel transmitted signal power or transmitter out-of-band emissions (OOBE)). In some embodiments, the prediction function may determine all or some on-channel and off-channel signal power contributions (for example, both on-channel interference power due to out-of-band emissions (OOBE) from an adjacent channel transmitter that falls into the desired channel (N), and the off-channel signal power that is present on the adjacent channel (N+/−1) from adjacent channel transmitters). Alternate channel transmissions (for example, channel N+/−2) may also be considered in the prediction function. The prediction function may consider on-channel power contributions from a desired base station as a desired signal level and both on-channel and off-channel contributions from other transmitters (for example, other base stations) as interference. In this manner, the prediction function may predict a complete radio signal environment (for example, signal power versus frequency) using the operating location of the radio 105. Also, in this manner, quantities such as a co-channel, adjacent channel, and alternate channel interference ratio may be determined for the radio receiver 240, based on the current operating location of the radio 105 and the corresponding signal levels. In addition, strong blocking signals (relative to the desired signal level) that are either in-band or out-of-band may also be identified. These quantities may be compared to the radio performance data 335 (for example, adjacent channel rejection (ACR), spurious response rejection (SRR), and intermodulation rejection (IMR)) to determine harsh interference environments and the appropriate set of operating parameters of the radio receiver 240 for the radio signal environment.

Alternatively or in addition, the prediction function may select the at least one base station from a plurality of base stations based on the operating location of the radio 105. For example, the prediction function may select one or more base stations located with a predetermined distance from the operating location of the radio 105. In some embodiments, the predetermined distance may be within the range from 1 kilometer to 200 kilometers or more. In some embodiments, the prediction function identifies these base stations by comparing the operating location of the radio 105 with the locations of base station included in the base station data 325. The predetermined distance may also be set based on the transmitted power level of each of the plurality of base stations, the antenna pattern of each of the plurality of base stations, the terrain features (for example, buildings, hills, and the like) located between the radio 105 and each of the plurality of base stations, or combinations thereof. Alternatively, the prediction function may use a predetermined distance based on a maximum transmission distance, a maximum transmission power level, or both for the plurality of base stations included in the base station data 325. Accordingly, the predetermined distance may be used to filter out base stations that are unlikely to noticeably impact the performance of the radio receiver 240. In general, the predetermined distance is related to how far away the signal in question may noticeably impact the performance of the radio receiver 240 (based on the current operating location of the radio 105 and on how much power is being transmitter by the base station). The predetermined distance may also depend on how far removed the interfering signal is in frequency from the desired signal (and the radio performance data 335 indicating receiver frequency response). Also, in general, when an interfering signal associated with a base station is approximately 10 to 20 decibels (dB) below a thermal noise floor, the impact of the interfering signal may be ignored. It should be understood that the level below the thermal noise floor may vary based on environmental noise, strong desired signal levels, or other factors.

As mentioned, in some embodiments, as an alternative to or in addition to considering the distance between the operating location of the radio 105 and the location of a base station to identify potential interference sources, the prediction function may consider other parameters associated with the radio receiver 240, base stations, the geographic terrain, or a combination thereof. For example, in some situations, specific models of the radio receiver 240 may be more susceptible to interference than other models (for example, based on differences in hardware, software, or a combination thereof). Therefore, for these specific models (which may be identified based on the radio performance data 335), the prediction function may use a different (for example, larger) predetermined distance than for other models. Similarly, when the radio 105 is located in a geographic terrain with a lot of potential shadowing obstructions (for example, a mountain or tall buildings) which may be identified based on the geographic data 330, the prediction function may use a different (for example, smaller) predetermined distance. Similarly, the prediction function may identify a base station as a potential interference source for the radio receiver 240 even when the base station is not located within the predetermined distance depending on the transmission characteristic of the base station. For example, when a base station has a high radiated output power level (for example, a high effective isotropic radiated power level or a high antenna height), the prediction function may identify the base station as a potential interference source for the radio receiver 240 even when base station is not located within the predetermined distance from the operating locating of the radio 105.

Alternatively or in addition, the prediction function may predict the radio signal environment of the radio receiver 240 based at least in part on a Doppler frequency of a signal received at the operating location of the radio 105. For example, the prediction function may estimate the Doppler frequency based on the transmission characteristics of the one or more base stations. In particular, in some embodiments, the prediction function estimates the Doppler frequency based on the locations of the one or more base stations and the relative velocity of the radio 105, which may be determined by the positioning system 230. Accordingly, in some embodiments, the setting function may set one or more operating parameters of the radio receiver 240 to adapt to the predicted radio signal environment based on the Doppler frequency. As an example, the setting function may adjust a frequency of an analog or digital oscillator based on the Doppler frequency to adapt the radio receiver 240 to the predicted radio signal environment. The oscillator, included in some embodiments of the radio receiver 240, may be utilized in a received signal down-conversion or baseband frequency compensation function. Setting operating parameters of the radio receiver 240 based in part on the Doppler frequency may allow the radio receiver 240 to adapt to a larger overall range of frequency offsets and improve reception when the radio 105 is positioned within a high speed train, aircraft, or other vehicle.

Alternatively or in addition, the prediction function may predict the radio signal environment of the radio receiver 240 based on other data in addition to the transmission characteristics of the one or more base stations. For example, the prediction function may predict the radio signal environment based on the transmission characteristics and the geographic data 330. For example, the prediction function may use the geographic data 330 to account for the effect of any objects located in the transmission path between a base station and the radio receiver 240, such as buildings, structures, foliage, and terrain when predicting a radio signal environment. The prediction function may also use the geographic data 330 to predict indirect signal path (for example, multipath).

Alternatively or in addition, the prediction function may predict the radio signal environment based on the transmission characteristics and the radio performance data 335. For example, the performance specifications included in the radio performance data 335 may identify specific types of radio signal environments that may be more challenging for particular models of the radio receiver 240. Accordingly, the prediction function may classify these specific radio signal environments differently for different models of the radio receiver 240 based on the performance specifications associated with the radio receiver 240. In some embodiments, the radio 105 may directly or indirectly transmit identification information of the radio receiver 240, the radio 105 or both, such as by transmitting a model number of the radio receiver 240, or other identifying information. The prediction function uses the received identification information to determine a performance specification associated with the radio receiver 240 included in the radio performance data 335 stored in the host memory 310.

Alternatively or in addition, the prediction function may predict the radio signal environment based on a measurement of a local radio signal. As noted above, the radio receiver 240 may experience interference from one or more local interference sources, such as unintentional emitters and interferers not otherwise captured in the base station data 325. Accordingly, the prediction function may determine a measurement of a local radio signal based on the number, location, frequency, and signal strength of these local interference sources. This data may be stored in the host memory 310, such as with the geographic data 330. For example, in some embodiments, a location or geographic region may be associated with a statistic representing a measurement of the local radio signal, which may be stored locally by the host device 110, such as within the host memory 310, or accessed by the host device 110 from an external source. In some embodiments, the statistic may represent an average, minimum, or maximum measurement of the local radio signal over a period of time.

Alternatively or in addition, as also noted above, the prediction function may predict the radio signal environment by classifying the radio signal environment into one of a plurality of potential cases or categories. The classification of the radio signal environment may be based on how many base stations were identified as potential interference sources for the radio receiver 240, how close one of or more of the identified bases stations are to the radio 105, the transmitter output power level of one or more identified bases stations, and the like. Also, in some embodiments, the prediction function may predict the radio signal environment of the radio receiver 240 by determining the difference between the signal strength of a desired signal of the radio receiver 240 and the signal strength of an undesired signal of the radio receiver 240. For example, FIG. 5 illustrates a method 500 of predicting the radio signal environment of the radio receiver 240, which may be performed as part of the prediction function described above (see block 415 of method 400).

Figure 5:
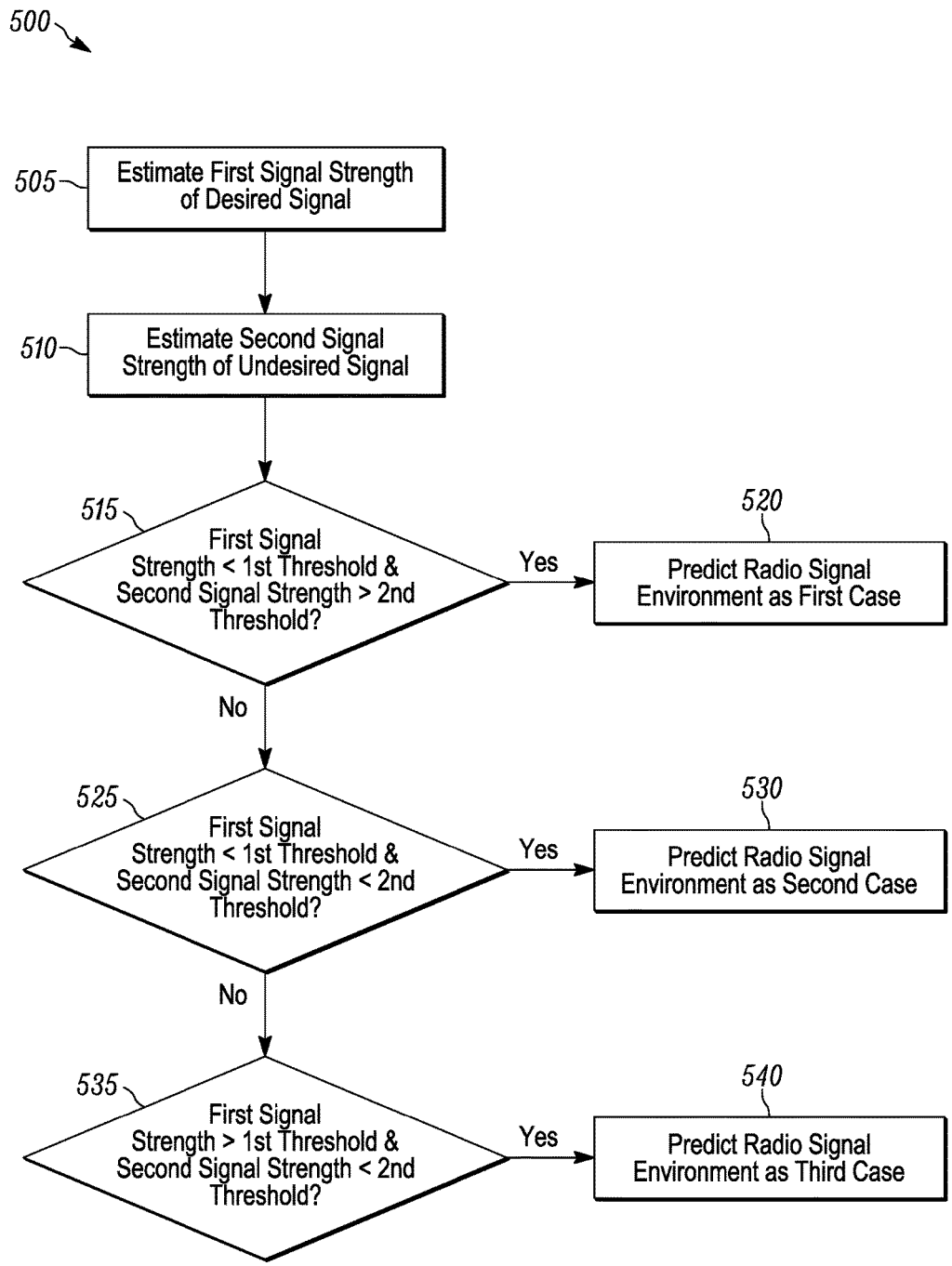
FIG. 5 is a flowchart of a method of predicting a radio signal environment of a radio receiver performed as part of the method of FIG. 4 in accordance with some embodiments.

As illustrated in FIG. 5, the method 500 includes estimating a first signal strength of a desired signal at the operating location of the radio 105 (at block 505). In particular, the prediction function may use one or more transmission parameters of the transmission characteristic of a base station, which the radio 105 is communicating with, to estimate the first signal strength of a desired signal. For example, in some embodiments, the prediction function may estimate the first signal strength of a desired signal based at least in part on the transmission characteristic of the first base station 115. In alternative embodiments, the prediction function may estimate the first signal strength of the desired signal based at least in part on the transmission characteristic of the first base station 115 and feedback of measured first signal strengths from the radio receiver 240.

As illustrated in FIG. 5, the prediction function also estimates a second signal strength of one or more undesired signals at the operating location of the radio 105 (at block 510). In particular, the prediction function may use one or more transmission parameters of the transmissions characteristics of one or more base stations, which were identified as potential interference sources for the radio receiver 240, to estimate the second signal strength of one or more undesired signals. For example, the prediction function may estimate a second signal strength of an undesired signal based at least in part on the transmission characteristic of the second base station 120. These predictions may vary depending on the operating location of the radio 105 and the geographic data 330.

It should be understood that, in some embodiments, the prediction function estimates the second signal strength based on the same transmission parameter (for example, transmitter output power level) or the same set of transmission parameters that the prediction function uses to estimate the first signal strength. However, in other embodiments, the prediction function estimates the second signal strength based on at least one or more transmission parameters that are different than the one or more transmission parameters the prediction function uses to estimate the first signal strength.

In addition, in some embodiments, the prediction function determines the first signal strength, the second signal strength, or both based on the geographic data 330, the radio performance data 335, or a combination thereof. For example, the prediction function may determine a signal strength based on terrain or objects located between the radio 105 and a base station defined within the geographic data 330. Further, the prediction function may use one or more signal propagation models (for example, the irregular terrain model (ITM), the Longley Rice propagation model, or any other propagation models) in determining signal strengths based on terrain. Similarly, the prediction function may determine a harmful interfering signal based on the performance specification of the radio receiver 240.

After determining the first signal strength and the second signal strength, the prediction function predicts the radio signal environment of the radio receiver 240 based at least in part on the first signal strength and the second signal strength. In some embodiments, multiple interfering signals (for example, from multiple base stations) may be predicted in combination (including both on-channel and out-of-band emissions). In general, the first signal strength may represent the predicted desired signal strength, and the second signal strength may represent an interfering signal (or combined interfering signal) strength. In some embodiments, the prediction function may predict the radio signal environment by classifying the predicted radio signal environment as one of a plurality of cases, wherein each case specifies a different amount, category (or range) of interference. For example, a first case may represent a harsh (for example, interference) radio signal environment, a second case may represent a weak (for example, desired) radio signal environment, and a third case may represent a benign radio signal environment.

It should be noted that the difference in signal levels and frequencies may be important in some situations. For example, once a predicted interfering signal on an adjacent channel exceeds the predicted desired signal by the adjacent channel rejection ratio of the radio receiver 240 (stored in the radio performance data 335), the operating parameters should be adapted to improve performance (for example, by turning on additional adjacent channel filtering). Similarly, when a predicted interfering signal on a more distant frequency exceeds the predicted desired signal by the blocker specification of the radio receiver 240, the operating parameters may be adjusted to improve receiver performance (for example, by switching to a higher linearity low noise amplifier (LNA), turning on front end attenuation, and/or altering receiver gain). It should be understood that, in other embodiments, the prediction function may classify a predicted radio signal environment into fewer, additional, or different cases. Other cases may represent other quantities, such as high frequency offset cases.

For example, as illustrated in FIG. 5, when the prediction function determines that the first signal strength of the desired signal is below a first threshold (i.e., the first signal strength is low or weak, for example, below −90 decibel-milliwatts (dBm)) and the second signal strength of the undesired signal is above a second threshold (i.e., the second signal strength is high or strong, for example, above −40 decibel-milliwatts) (at block 515), the prediction function classifies the predicted radio signal environment as the first case (at block 520). As explained above, the first case may represent a harsh interference case where desired signals received by the radio receiver 240 may experience a lot of interference (when the first desired signal strength is weak or a certain amount below the interfering signal strength). As noted above, when the interfering signal level exceeds the desired signal level by more than some threshold (for example, approximately 30 decibels for an adjacent channel and approximately 50 decibels for an alternate channel), corrective action may need to be taken in the radio receiver 240 (by adjusting operating parameters of the radio receiver 240, as further described below). It should also be noted that these differential thresholds or ratios (for example, adjacent channel rejection (ACR) and inter-modulation rejection (IMR)) may also vary in relation to the desired signal strength. For example, the adjacent channel rejection of the radio receiver 240 may be better (for example, higher) with a weak desired signal than with a strong desired signal. In some embodiments, the differential thresholds may also be stored in the radio performance data 335 of the host memory 310. The prediction function may then account for more precise radio performance data for the specific radio signal environment.

Alternatively, when the prediction function determines that the first signal strength of the desired signal is below the first threshold and the second signal strength of the undesired signal is below the second threshold (at block 525), the prediction function classifies the predicted radio signal environment as the second case (at block 530). As explained above, the second case may represent a weak level where desired signals received by the radio receiver 240 may experience little interference (for example, less interference than the first level) but the desired signals may be weak and, hence, more susceptible to noise. For example, susceptible weak signals may be encountered when a desired signal level is below the first threshold (for example, below −90 decibel-milliwatts), and the interfering signals are the second threshold (for example, below −110 decibel-milliwatts). Again, in this case, special corrective action may be taken in the radio receiver 240 (for example, by adjusting operating parameters of the radio receiver 240 to increase receiver front-end gain, as further described below).

In the above two cases (or in other cases), the setting function may determine that the best way to adapt the radio receiver 240 is to change to another communication channel or communication system (for example, in cases of very strong interference, or very weak desired signals). The other communication channel may be a channel within the same basic communication system (for example, switching to another narrowband channel, or another base station within the system), or it may involve changing to another communication channel in another system (for example, switching from a Band-14 Public Safety Long Term Evolution system to a Band-13 Commercial Long Term Evolution system, from a Band-14 broadband Public Safety LTE system to a narrowband P25 system, or from an unlicensed Wi-Fi channel to a licensed 3G commercial cellular system). Once an interference or weak signal condition has cleared, the setting function may determine that the radio receiver 240 may be switched back to the original channel or system (for example, which may be useful in cases where the radio 105 may have a higher priority or a lower cost on a public safety system than on a commercial system). In this manner, the operating channel of the radio receiver 240 may be adapted based at least in part on the operating location of the radio 105.

Alternatively, when the prediction function determines that the first signal strength of the desired signal is above the first threshold and the second signal strength of the undesired signal is below the second threshold (at block 535), the prediction function classifies the predicted radio signal environment as the third case (at block 540). As explained above, the third case may represent a benign level where desired signals received by the radio receiver 240 may experience little interference (for example, less interference or noise than the first level, the second level, or both) and the desired signals may be strong and, hence less susceptible to interference. For example, when the desired signal is significantly above (for example, by more than 20 decibels) the interfering signal levels at the radio receiver 240, the prediction function may take other actions (for example, to reduce current drain) by adjusting operating parameters of the radio receiver 240, as further described below.

It should be understood, however, that different thresholds may be used in different applications and, in some embodiments, the first threshold and the second threshold may have different values or the same values. Also, in some embodiments, a range may be used to distinguish a low signal strength from a high signal strength. In addition, in some embodiments, the prediction function may determine a composite value, such as a ratio, based on the first signal strength and the second signal strength (for example, the differences between the first signal strength and the second signal strength) and compare the composite value to one or more thresholds or ranges to classify the predicted radio signal environment. The above thresholds, ratios or levels may vary based on the model of the radio receiver 240, the utilized modulation (for example, continuous 4 level frequency modulation (C4FM) vs. quadrature phase-shift keying (QPSK) vs. 64-quadature amplitude modulation (64-QAM)), and the relative signal strengths.

Also, it should be understood that combinations of the first signal strength and the second signal strength not falling into one of the three cases described above may default to one of the cases or be assigned to a fourth, default case. For example, when the first signal strength of the desired signal is above the first threshold and the second signal strength of the undesired signal is above the second threshold, the prediction function may classify the predicted radio signal environment as a fourth case. In some embodiments, the prediction function does not set any operating parameters of the radio receiver 240 when the predicted radio signal environment is classified as the fourth case.

By way of further example, the fourth case may alternatively represent a high Doppler shift or frequency offset environment (as described above), where specific adjustments may be made to the operating parameters of the radio receiver 240 to improve performance of the radio receiver 240. Additional cases (for example, a fifth case for a particular predicted combination of interferers, a sixth case for a particular strong blocker signal, and a seventh case for a particular multipath environment) may also be incorporated. In this manner, there is no limit to the number of cases or radio signal environment classifications that may be performed. As mentioned above, the frequency of particular interferers may impact how the radio receiver 240 is adapted to deal with particular interference cases. Some cases may even be allowed to overlap, though a set of consistent operating parameters of the radio receiver 240 may be chosen for each case under those conditions.

It should also be noted that even though a radio signal environment may be classified into a particular case, the amount of adjustment of the operating parameters may be variable within that case (and be dependent in part on the predicted signal levels). Also, as explained above, in some embodiments, the predicted signal levels determined by the prediction function may be augmented with local measurements performed by the radio receiver 240. The local measurements may be filtered or averaged (possibly across multiple radios), and used as a correcting function for the predictions, by using adaptive signal processing techniques (for example, least mean squares (LMS), recursive least squares (RLS), or minimum mean square error (MMSE) filtering or estimation). In this manner, the accuracy of the predicted radio signal environment may be improved, and more accurate adjustments of the operating parameters of the radio receiver 240 may be obtained. These results may in turn be incorporated into the prediction function.

Figure 6:
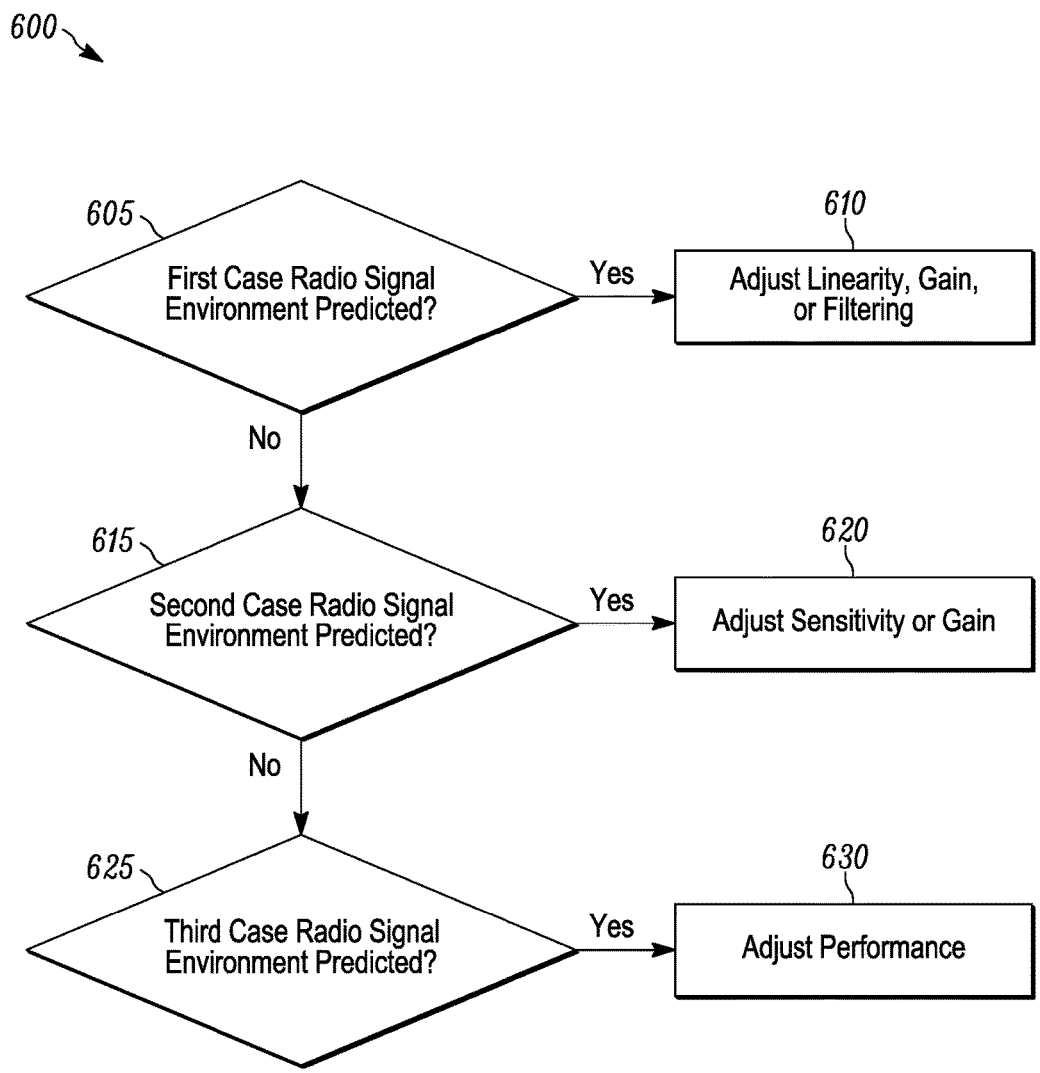
FIG. 6 is a flowchart of a method of setting an operating parameter of a radio receiver performed as part of the method of FIG. 4 in accordance with some embodiments.

After classifying the predicted radio signal environment, the setting function may set the operating parameter of the radio receiver 240 based on the classification. For example, FIG. 6 illustrates an example of a method 600 of setting an operating parameter of the radio receiver 240 based on the predicted radio signal environment (from the prediction function). In some embodiments, the method 600 may be performed as part of the setting function described above (see block 420 included in the method 400).

As illustrated in FIG. 6, when the prediction function classifies the predicted radio signal environment as the first case (at block 605), the setting function may adjust the linearity, gain, or the filtering of the radio receiver 240 to compensate for the harsh radio signal environment (at block 610). For example, when the radio signal environment is classified as the first case, the radio receiver 240 may enable high linearity low-noise amplifiers, enable front-end attenuators, and/or enable narrower or sharper bandpass filtering of the desired first signal or notch filtering of the undesired interfering second signal. In some embodiments, the attenuation may be determined by the order of the receiver impairment and its frequency offset (for example, first-order for saturation/clipping, third or fifth order for intermodulation and spectral regrowth, and the like). The amount of attenuation or gain adjustment may also depend on the particular signal strengths involved (of the desired signal, the interfering signal(s), or both).

In some cases, there may be more than one interfering signal (that is modeled based on base station transmission characteristics from multiple transmitters). In this case as well, the frequency of the interfering signals may be important, since inter-modulation distortion depends on the relative frequencies involved, as well as the signal strengths of the interferers (for example, one interferer may be present at around some frequency offset $F_1$ (relative to the desired signal)), while a second interferer may be present at around $2F_1$, which could result in inter-modulation distortion to the desired signal). Higher order inter-modulation (at higher order frequency multiples) may also occur. Note that cross-modulation (with a single interfering carrier) may occur as well (and may not be strongly dependent on a particular interfering signal frequency). In general, the radio receiver 240 may be pre-characterized (for example, in the lab) for any type of interferer scenario (for example, two out-of-band broadband signals interfering for a narrowband land mobile radio receiver) to characterize radio receiver performance in those cases. This information may be stored in the radio performance data 335 of the host memory 310 and helps the setting function predict how the radio receiver 240 will perform when subject to a particular interference scenario and how to best adapt the operating parameters of the radio receiver 240 (for example, by adjusting the filtering and the individual gain stages of the radio receiver 240 to best handle the interference).

Alternatively, when the prediction function classifies the predicted radio signal environment as the second case (at block 615), the setting function may adjust a sensitivity or gain of the radio receiver 240 to compensate for the weak radio signal environment (at block 620). For example, when the radio signal environment is classified as the second case, the radio receiver 240 may disable high insertion loss components (for example, attenuators and the like) and increase the front-end gain or relax the front-end selectivity/filtering to allow more desired signal energy to pass.

Alternatively, when the prediction function classifies the predicted radio signal environment as the third case (at block 625), the setting function may adapt the performance of the radio receiver 240 to adjust to the benign radio signal environment (at block 630). For example, when the predicted radio signal environment is classified as the third case, the setting function may disable one or more filters or additional signal processing (for example, disabling diversity reception, equalization, and/or error correcting coding iterations) performed by the radio receiver 240, which may reduce unnecessary power consumption of the radio 105.

As noted above, in some embodiments, the prediction function may classify the predicted radio signal environment to a default case, such as when the predicted radio signal environment may not require enhanced signal processing due to interference or reduced signal processing due to a lack of interference. In these situations, the setting function may not set an operating parameter of the radio receiver 240 and the radio receiver 240 may operate accordingly to a default operating parameter.

As noted above, it should be understood that although the methods described above are described in terms of the host device 110 providing the functionality (performing the prediction function and the setting function), the functionality may be performed, in whole or in part, by another device. For example, in some embodiments, the radio 105 (for example, the radio electronic processor 205) performs the prediction function and the setting function locally. In particular, the data stored in the host memory 310 may be stored locally on the radio 105 and the radio electronic processor 205 may perform the methods described above or a portion thereof. Similarly, in some embodiments, the radio 105 may query the host device 110 for data included in the base station data 325, the geographic data 330, the radio performance data 335, or a combination thereof, which the radio 105 may use to perform the prediction function, the setting function, or both. Alternatively or in combination, the host device 110 may perform the prediction function as described above and may provide the predicted radio signal environment, such as a classification of the predicted radio signal environment, to the first base station 115, the radio 105, or both. The radio 105 may receive the predicted radio signal environment and perform the setting function as described above. In some embodiments, the predicted radio signal environment may be pre-generated by the prediction function, and stored in a database, which may in turn be stored in the radio 105. In some embodiments, this database contains compressed data on desired and interfering signal strengths versus a plurality of operating locations of the radio 105. The database may also contain other data (for example, multipath or delay spread predictions and/or Doppler shift predictions) versus operating locations of the radio 105. Also, as noted above, in some embodiments, the functionality performed by the host device 110 described above or a portion thereof may be performed by the first base station 115. Similarly, the functionality performed by the host device 110 described above or a portion thereof may be distributed among a plurality of servers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of setting an operating parameter of a radio receiver included in a radio, the method comprising:
pre-storing base station data in a memory;
determining an operating location of the radio;
determining a transmission characteristic of at least one base station by accessing the base station data stored in the memory, wherein the transmission characteristic of the at least one base station includes a transmitter output power level of the at least one base station;
determining a performance specification associated with the radio receiver based on identification information of the radio, wherein the performance specification including at least one selected from a group consisting of a receiver sensitivity level, a receiver adjacent channel rejection level, an alternate channel rejection level, an inter-modulation rejection level, and a tolerable blocker level;
predicting, with an electronic processor, a radio signal environment of the radio receiver based on the transmission characteristic of the at least one base station, the operating location of the radio, and the performance specification associated with the radio receiver; and
setting the operating parameter of the radio receiver based on the radio signal environment.

2. The method of claim 1, further comprising selecting the at least one base station from a plurality of base stations based on the operating location of the radio.

3. The method of claim 1, wherein the transmission characteristic of the at least one base station further includes at least one transmission parameter selected from a group consisting of a transmitter frequency of the at least one base station, an antenna height of the at least one base station, an antenna pattern of the at least one base station, an out of band emissions level of the at least one base station, an effective isotropic radiated power of the at least one base station, and a transmission timing reference of the at least one base station.

4. The method of claim 1, wherein predicting the radio signal environment includes estimating a first signal strength of a desired signal at the operating location of the radio, estimating a second signal strength of an undesired signal at the operating location of the radio, and predicting the radio signal environment of the radio receiver based on the first signal strength and the second signal strength.

5. The method of claim 1, wherein predicting the radio signal environment includes estimating a frequency of an undesired signal at the operating location of the radio based on the transmission characteristic of the at least one base station and predicting the radio signal environment of the radio receiver based on the frequency.

6. The method of claim 1, wherein predicting the radio signal environment includes estimating a frequency offset of a signal at the operating location of the radio based on the transmission characteristic of the at least one base station and predicting the radio signal environment of the radio receiver based on the frequency offset.

7. The method of claim 6, wherein estimating the frequency offset of the signal at the operating location includes estimating a Doppler frequency based on a location of the at least one base station and a relative velocity of the radio.

8. The method of claim 1, further comprising determining a measurement of a local radio signal, and wherein predicting the radio signal environment includes predicting the radio signal environment based on the transmission characteristic of the at least one base station and the measurement of the local radio signal.

9. The method of claim 1, wherein setting the operating parameter of the radio receiver based on the radio signal environment includes at least one selected from a group consisting of changing a communication channel of the radio receiver, changing a communication system of the radio receiver, changing a filtering mode of the radio receiver, changing a linearity mode of the radio receiver, changing an attenuation of the radio receiver, changing a gain of the radio receiver, changing a local oscillator of the radio receiver, adjusting a Doppler shift of the radio receiver, changing an equalization mode of the radio receiver, and changing a diversity reception mode of the radio receiver.

10. The method of claim 1, wherein setting the operating parameter of the radio receiver based on the radio signal environment includes disabling functionality of the radio receiver.

11. The method of claim 1, further comprising predicting an updated radio signal environment of the radio receiver when the operating location of the radio receiver changes by more than a predetermined amount.

12. The method of claim 1, further comprising predicting an updated radio signal environment of the radio receiver when the operating location of the radio changes by more than a predetermined amount, wherein the predetermined amount is based at least in part on the operating location the radio.

13. A communication system comprising:
a radio including a radio receiver; and
a host device including a memory and an electronic processor configured to
  determine an operating location of the radio,
  determine a transmission characteristic of at least one base station, wherein the transmission characteristic of the at least one base station includes a transmitter output power level of the at least one base station,
  determine a performance specification associated with the radio receiver based on identification information of the radio, wherein the performance specification including at least one selected from a group consisting of a receiver sensitivity level, a receiver adjacent channel rejection level, an alternate channel rejection level, an inter-modulation rejection level, and a tolerable blocker level,
  predict a radio signal environment of the radio receiver based on transmission characteristic of the at least one base station, the operating location of the radio, and the performance specification associated with the radio receiver, and
  set an operating parameter of the radio receiver based on the radio signal environment.

14. The communication system of claim 13, wherein the transmission characteristic of the at least one base station further includes at least one transmission parameter selected from a group consisting of a transmitter frequency of the at least one base station, an antenna height of the at least one base station, an antenna pattern of the at least one base station, an out of band emissions level of the at least one base station, and a transmission timing reference of the at least one base station.

15. The communication system of claim 13, wherein the electronic processor is configured to set the operating parameter of the radio receiver based on the radio signal environment by performing at least one selected from a group consisting of changing a communication channel of the radio receiver, changing a filtering mode of the radio receiver, changing a linearity mode of the radio receiver, changing an attenuation of the radio receiver, changing a gain of the radio receiver, changing a local oscillator of the radio receiver, adjusting a Doppler shift of the radio receiver, changing an equalization mode of the radio receiver, and changing a diversity reception mode of the radio receiver.

16. A radio comprising:
a radio receiver;
a memory; and
an electronic processor configured to
  pre-store base station data in the memory,
  determine an operating location of the radio,
  determine a transmission characteristic of at least one base station by accessing the base station data stored in the memory, wherein the transmission characteristic of the at least one base station includes a transmitter output power level of the at least one base station,
  determine a performance specification associated with the radio receiver based on identification information of the radio, wherein the performance specification including at least one selected from a group consisting of a receiver sensitivity level, a receiver adjacent channel rejection level, an alternate channel rejection level, an inter-modulation rejection level, and a tolerable blocker level,
  predict a radio signal environment of the radio receiver based on the transmission characteristic of the at least one base station, the operating location of the radio, and the performance specification associated with the radio receiver, and
  set an operating parameter of the radio receiver based on the radio signal environment.

17. The radio of claim 16, wherein the transmission characteristic of the at least one base station further includes at least one transmission parameter selected from a group consisting of a transmitter frequency of the at least one base station, an antenna height of the at least one base station, an antenna pattern of the at least one base station, an out of band emissions level of the at least one base station, and a transmission timing reference of the at least one base station.

18. The radio of claim 16, wherein the electronic processor is configured to set the operating parameter of the radio receiver based on the radio signal environment by performing at least one selected from a group consisting of changing a communication channel of the radio receiver, changing a communication system of the radio receiver, changing a filtering mode of the radio receiver, changing a linearity mode of the radio receiver, changing an attenuation of the radio receiver, changing a gain of the radio receiver, changing a local oscillator of the radio receiver, adjusting a Doppler shift of the radio receiver, changing an equalization mode of the radio receiver, and changing a diversity reception mode of the radio receiver.

* * * * *